(12) United States Patent
Köhnke et al.

(10) Patent No.: US 10,165,099 B2
(45) Date of Patent: Dec. 25, 2018

(54) DEVICE FOR COUPLING A MOBILE COMMUNICATIONS UNIT WITH A MOTOR VEHICLE

(71) Applicant: VOLKSWAGEN AG, Wolfsburg (DE)

(72) Inventors: Axel Köhnke, Dülmen (DE); Rainer Frauenfelder, Harsum (DE)

(73) Assignee: VOLKSWAGEN AG, Wolfsburg (DE)

( * ) Notice: Subject to any disclaimer, the term of this patent is extended or adjusted under 35 U.S.C. 154(b) by 77 days.

(21) Appl. No.: 15/232,242

(22) Filed: Aug. 9, 2016

(65) Prior Publication Data

US 2017/0048368 A1 Feb. 16, 2017

(30) Foreign Application Priority Data

Aug. 10, 2015 (DE) .................. 10 2015 215 240

(51) Int. Cl.
```
H02J 7/02      (2016.01)
H04M 1/60      (2006.01)
B60R 11/02     (2006.01)
H04W 4/80      (2018.01)
B60R 11/00     (2006.01)
H04B 5/00      (2006.01)
```
(52) U.S. Cl.
CPC ....... *H04M 1/6091* (2013.01); *B60R 11/0241* (2013.01); *H04W 4/80* (2018.02); *B60R 2011/0007* (2013.01); *B60R 2011/0014* (2013.01); *B60R 2011/0294* (2013.01); *H04B 5/0056* (2013.01)

(58) Field of Classification Search
None
See application file for complete search history.

(56) References Cited

U.S. PATENT DOCUMENTS

| 2008/0284665 | A1* | 11/2008 | Pfletschinger | ......... H01Q 1/325 343/713 |
| 2010/0201189 | A1* | 8/2010 | Kirby | .................. H04B 5/0037 307/9.1 |
| 2012/0091948 | A1* | 4/2012 | Shinde | ..................... B60R 7/04 320/108 |
| 2012/0184200 | A1* | 7/2012 | Chutorash | ............. G08C 17/02 455/1 |

(Continued)

FOREIGN PATENT DOCUMENTS

DE  10 2011 120 250 A1   6/2013
DE  10 2012 020 611 A1   4/2014

(Continued)

OTHER PUBLICATIONS

European Search Report issued in counterpart European Application No. 16178820.3, report dated Dec. 13, 2016.

(Continued)

*Primary Examiner* — David Bilodeau
(74) *Attorney, Agent, or Firm* — Hunton Andrews Kurth LLP

(57) ABSTRACT

A device for coupling a mobile communications unit with a motor vehicle may be placed between a driver seat and a passenger seat of the motor vehicle and includes a surface on which the mobile communications unit may be placed. An antenna is adapted to emit and/or receive a radio signal for the near field communication with the mobile communications unit.

24 Claims, 3 Drawing Sheets

(56) References Cited

U.S. PATENT DOCUMENTS

| | | | | |
|---|---|---|---|---|
| 2013/0038280 A1* | 2/2013 | Boundy | ............... | B60R 7/04 |
| | | | | 320/108 |
| 2013/0197764 A1* | 8/2013 | Thomas | ............ | B60R 21/0136 |
| | | | | 701/45 |
| 2013/0249482 A1* | 9/2013 | Iwanaga | ............. | H02J 50/80 |
| | | | | 320/108 |
| 2014/0058586 A1* | 2/2014 | Kalhous | ............. | B60R 25/24 |
| | | | | 701/2 |
| 2014/0200765 A1* | 7/2014 | Waeller | ............ | H04L 12/282 |
| | | | | 701/36 |
| 2014/0203770 A1* | 7/2014 | Salter | ............... | H02J 7/0047 |
| | | | | 320/108 |
| 2015/0038073 A1* | 2/2015 | Vang | ............... | H04W 76/02 |
| | | | | 455/41.1 |
| 2016/0087485 A1* | 3/2016 | Maeda | ............... | H02J 7/025 |
| | | | | 455/573 |
| 2016/0272154 A1* | 9/2016 | Sanji | ............... | B60R 25/24 |

FOREIGN PATENT DOCUMENTS

| | | |
|---|---|---|
| EP | 2 629 364 A1 | 8/2013 |
| JP | 2014-175855 A | 9/2014 |
| WO | 2010/065408 A2 | 6/2010 |
| WO | 2013/034285 A1 | 3/2013 |
| WO | 2015/064020 A1 | 5/2015 |

OTHER PUBLICATIONS

"Near field communication", Wikipedia, entry revised Jul. 31, 2013, copy retrieved Jan. 27, 2014. XP055098492A.

\* cited by examiner

DEVICE FOR COUPLING A MOBILE COMMUNICATIONS UNIT WITH A MOTOR VEHICLE

CROSS-REFERENCE TO RELATED APPLICATIONS

The present application claims priority to Application No. 10 2015 215 240.5, filed in the Federal Republic of Germany on Aug. 10, 2015, which is expressly incorporated herein in its entirety by reference thereto.

FIELD OF THE INVENTION

Exemplary embodiments of the present invention relate to the communication between a motor vehicle and a mobile communications unit by near field communication. More specifically, exemplary embodiments of the present invention pertain to a device for coupling a mobile communications unit with a motor vehicle.

BACKGROUND INFORMATION

Near field communication (NFC) is a radio technology that allows a contactless exchange of data across short distances (e.g., distances of up to 20 centimeters) and uses radio signals in the MHz range for this purpose. For example, near field communication provides a data transmission rate of up to 424 kbits/s at a radio frequency of 13.56 MHz and a distance of about 10 centimeters between the communications partners.

In the automotive industry, near field communication can be employed for the exchange of data between a motor vehicle and a mobile communications unit (such as a mobile telephone or tablet) of a passenger of the motor vehicle. For instance, a user detection, an initiation of a Bluetooth communication, or a WLAN communication between the motor vehicle and mobile communications unit may be carried out using near field communication. The spatial proximity between the mobile communications unit and near field communications device provides additional security. Moreover, navigation data may be exchanged between the mobile communications unit and a navigation system of the vehicle, for example, or telephone numbers or contact information be transmitted between the mobile communications unit and communications devices of the motor vehicle. Mobile payments with the aid of the mobile communications unit may be processed via near field communication as well. Near field communication thus allows a wireless integration of the mobile communications unit into the communications environment of the motor vehicle. In particular, an interaction of the user with the motor vehicle is able to be facilitated by near field communication.

An antenna provided in the motor vehicle for the near field communication, for example, may be integrated in the region of a head unit (which could include the control unit for the antenna, as well) of the center console (i.e., on the instrument panel) or in the charge surface of a wireless charger for a mobile communications unit. Since near field communication requires a spatial proximity of the mobile communications unit and the antenna installed in the motor vehicle for the near field communication, antennas at the previously mentioned locations can usually be accessed only by vehicle occupants in the driver and passenger seats. Passengers in the rear passenger compartment are usually unable to bring a mobile communications unit into the required proximity to the antenna, so that a communication or interaction with the motor vehicle may be impossible for them or at least more difficult. Furthermore, when the antenna is integrated into the charge surface of the charger, the antenna is covered by a mobile communications unit to be charged that is placed on the charge surface, so that a near field communication with another mobile communications unit may possibly be more difficult if not impossible. In addition, chargers for mobile communications units are located in the center console (e.g., directly in the instrument panel or in a transition region to the center console tunnel, i.e., a region in front of a front-side end of the front seats), so that passengers in the rear passenger compartment are practically unable to reach the antenna for the near field communication.

Therefore, an antenna for near field communication must be installed in a location that is easily accessible to all passengers of the motor vehicle.

SUMMARY

Exemplary embodiments of the present invention make this possible by a device for coupling a mobile communications unit with a motor vehicle. The device may be placed between a driver seat and a passenger seat of the motor vehicle and includes a surface on which the mobile communications unit may be placed. The surface is an area that is directly and freely accessible to a passenger of the vehicle, i.e., it cannot be covered by other components (e.g., a cover or flap) or locked. A passenger is able to place the mobile communications unit directly on this surface, without any further manual steps for exposing the surface. The device also includes an antenna, which is adapted to emit and/or receive a radio signal for the near field communication with the mobile communications unit. Because the device is situated between the driver and passenger seats, the antenna is in a central location of the passenger compartment of the motor vehicle. Passengers both in the front seats of the motor vehicle and passengers riding in the rear can therefore access the antenna in a comfortable manner. For example, the antenna may be disposed on a center armrest, a center console tunnel (center tunnel), or a gear selector lever for a gear stage or gear. The surface, for instance, may be at a distance from the antenna that is sufficient for near field communication (e.g., 10 cm or less). As a result, both passengers in the front seats and in the rear seats are easily able to bring a mobile communications unit close enough to the antenna to enable a communication between motor vehicle and mobile communications unit in this manner. The passengers are therefore able to interact with the motor vehicle in a comfortable manner.

The radio signal may have a frequency of under 100 MHz. The frequency range of the radio signal allows a near field communication in the license-free frequency band at 13.56 MHz, so that the near field communication is able to be made available in a cost-effective manner. Moreover, the frequency band is supported by mobile communications units available on the market, so that compatibility with many obtainable mobile communications units can be ensured. For example, this allows a near field communication at a data transmission rate of up to 424 kbits/s at a distance of approximately 10 centimeters between the mobile communications unit and the antenna.

The device may include a center armrest, which is adapted to support an arm of a person seated in the driver seat or the passenger seat. The center armrest is a padded component, which may be covered by cloth and/or leather as the exterior material and offers a support area for the person's arm. The center armrest, for example, may be disposed, i.e., fixed in place, on the driver seat or the passenger seat. As an alternative, for example, the armrest may be situated on a center console tunnel (center tunnel) of the motor vehicle, which adjoins the center console in the instrument panel, extends along a longitudinal direction of the motor vehicle between the driver and passenger seats, and may include a multitude of operating elements (selector lever for the gear stage, handbrake, etc.). The center armrest may be implemented as one piece, e.g., as a single, contiguous support area for an arm, or it may be made up of multiple pieces, i.e., a system of multiple partial support areas that jointly form a support area for an arm. The partial support areas may be able to move in relation to each other (e.g., slide or rotate). By supporting the arm, the center armrest may provide excellent seating comfort for a person in the driver or passenger seat. The antenna is situated on the center armrest. For example, the antenna may be disposed on an exterior surface (e.g., an exterior material) of the center armrest. As an alternative, the antenna may be situated within the center armrest. The antenna may be embedded in a padding material of the center armrest, for instance. The center armrest is situated in a central location of the motor vehicle and thereby makes it possible to place the antenna in an especially advantageous position. Instead of the armrest, some other surface in a central location, e.g., a tray element, may be used as well. Because of the central installation of the center armrest in the motor vehicle, the antenna can be comfortably reached both by passengers in the front seats of the motor vehicle and passengers riding in the rear. Passengers in the front seats and in the rear seats are therefore easily able to bring a mobile communications unit close enough to the antenna to enable a communication between the motor vehicle and mobile communications unit.

The antenna may be situated at a vertically upper or a vertically lower position of the center armrest when the support area of the center armrest for the arm of the person is in a horizontal position. The vertically upper or vertically lower position, for example, is a position that has vertical clearance from a vertically upper or a vertically lower exterior fabric of the center armrest (i.e., a topside or underside of the center armrest) of no more than 5%, 10%, 15%, 20%, or 25% of a vertical overall height of the center armrest. The arrangement at the vertically upper position of the center armrest, e.g., just below the exterior material of the center armrest forming the support area, allows a short distance between the antenna and a mobile communications unit that is held or positioned against the support area of the center armrest. Sufficient proximity between the mobile communications unit and the antenna for the near field communication is therefore able to be provided. The placement at the vertically lower position of the center armrest, e.g., just above the vertically lower exterior material of the armrest, may allow a short distance between the antenna and a first mobile communications unit, which is situated or held below the center armrest (e.g., in a holding device on the center console tunnel or a charge surface of a wireless charger). In addition, the placement at the vertically lower position of the center armrest may allow a short distance between the antenna and a second mobile communications unit that is situated or held above the center armrest (e.g., by a passenger in the rear passenger compartment). This therefore makes it possible to provide sufficient proximity between the antenna and the two mobile communications units for the near field communication.

Depending on the particular configuration of the antenna, it may need to be protected from mechanical stresses. In certain configurations, the antenna is situated on a carrier that has greater rigidity than the antenna itself. The carrier may feature a combination of a more rigid and a relatively more flexible material. The carrier may be situated between the antenna and an exterior material of the center armrest that has the shortest vertical distance from the antenna when the support area is in the horizontal position. When the antenna is situated at the vertically upper position, for instance, the carrier is located between the exterior material that forms the support area and the antenna. Because of its higher rigidity, the carrier is able to prevent the antenna from being deformed by externally acting mechanical forces and from being damaged or destroyed as a result. For example, the carrier may be immediately adjacent to the exterior material, so that a passenger is haptically able to perceive the position of the antenna by touching the center armrest. In addition, the carrier may be joined to the exterior material via seams (such as decorative seams), so that the user becomes aware of the positioning within the center armrest not only haptically but optically, as well. The joining to the exterior material may also take the form of bonding or a pocket/insertion construction. The carrier may be made from a non-metallic material in order not to affect a radiation or reception characteristic of the antenna. For instance, the carrier may be a circuit board on which the antenna is situated. The carrier may be disposed on an external surface of the center armrest, which enhances the haptic perception by vehicle passengers (e.g., by an appropriate surface structure of the carrier). In addition, a visual perception by vehicle passengers may be improved by an appropriate color selection of the carrier, for example, so that selective positioning of a mobile communications unit in the vicinity of or on the carrier (and thus close to the antenna) can be simplified. The carrier may additionally have higher rigidity than a padding material of the center armrest. This ensures that a force acting on the carrier can be absorbed by the (temporary) deformation of the padding material, thereby increasing the antenna's protection from mechanical deformation even further.

The antenna may be applied as printed circuit on a circuit board (PCB: Printed Circuit Board), which may be connected to or covered by a more flexible material. This more flexible material may constitute a decorative surface, and if it projects slightly along the sides, it can be integrated into the material of the top surface or the exterior material more easily (for instance by sewing).

The surface on which the mobile communications unit may be placed may be situated on the center armrest and may be adapted to retain the mobile communications unit on the center armrest. The surface may thus make it possible to hold the mobile communications unit securely in place on the center armrest in spatial proximity to the antenna. For example, the surface may be provided with an anti-slip coating or structure, i.e., have a surface that is able to provide sufficient retention force between the surface itself and a surface of the mobile communications unit situated thereon. As an alternative or in addition, the surface may be part of a depression in the center armrest, into which the mobile communications unit can be placed. In addition, the surface may have clamping elements in order to prevent the mobile communications unit from sliding. The support area of the center armrest is easily accessible to passengers of the motor vehicle, so that even a touchscreen of a mobile communications unit placed on the surface is directly accessible to the vehicle occupants. An infotainment system of the motor vehicle, for instance, may therefore be comfortably operated by the passengers via the mobile communications unit.

The device may also include a separate control unit, which is coupled with the antenna and adapted for transmitting a signal to the mobile communications unit or for receiving one from the mobile communications unit via the antenna. The antenna, and consequently the near field communication between the motor vehicle and mobile communications unit, thus is controllable with the aid of the control unit. Separating the control unit and the antenna allows the control unit to be positioned in many different manners inside the motor vehicle, which facilitates an ergonomic design of the vehicle passenger compartment. Moreover, because the control unit and the antenna are separated, it is possible to utilize a control unit that is already available in the motor vehicle. For example, the already existing control unit may be supplemented by the functionality for the near field communication via the antenna. To do so, for example, existing software of the control unit may be updated in order to add the functionality. The control unit may be coupled with further control units or processing units of the motor vehicle. As a result, a near field communications interface for the vehicle is able to be provided in a fairly uncomplicated and also cost-effective manner.

The control unit may be adapted to control a charge device. The charge device is configured to provide energy for charging an energy store of the mobile communications unit in a wireless manner (e.g., by induction). As an alternative or in addition, the control unit is configured to control a coupling device, which is adapted for coupling an external antenna of the motor vehicle with an antenna of the mobile communications unit. The control unit thus may control multiple functionalities, so that possibly only a single control unit may be required for controlling the functionalities. For example, an already existing control unit for controlling the charge device or the coupling device may be supplemented by the near field communications functionality, so that it may then be used for controlling the antenna as well. As a result, the near field communications functionality for the motor vehicle is able to be made available in a simple and cost-effective manner utilizing an already existing control unit.

The control unit may be provided on a center console tunnel of the motor vehicle, so that, for example, a control unit already installed in the center console tunnel may be utilized. Moreover, short lines for connecting the antenna to the control device are able to be used on account of the placement in the center console tunnel. The lines, for example, may be routed through the center armrest within the padding material of the center armrest and guided out of the armrest in the direction of the center console tunnel via a passage. The control unit may be situated on the center armrest itself. It may therefore be possible to utilize a control unit already installed in the center armrest or to integrate a control unit into the center armrest. For example, a control unit in the center armrest may replace a control unit currently situated in the center console tunnel. Very short lines between the control unit and antenna may be used for a control unit in the center armrest.

The center armrest may be movably disposed at the center console tunnel. For example, the center armrest may be situated at the center console tunnel in a manner that allows it to slide. As an alternative or in addition, the center armrest may be situated at the center console tunnel and be rotatable. This makes it possible to adapt the position of the center armrest to the comfort requirements of an occupant in the driver or passenger seat. Because of the mobile placement of the center armrest at the center console tunnel, recesses or depressions or other functionalities (e.g., a holding device) may additionally be provided underneath the center armrest, which can be covered or uncovered by moving the center armrest. As a result, options for placing a mobile communications unit inside the center console tunnel are able to be provided.

The charge device may be disposed vertically below a position of the antenna at the center console tunnel. Positioning the charge device at the center console tunnel underneath the antenna makes it possible to charge a first mobile communications unit using the charge device and at the same time to ensure that the first mobile communications unit is in close proximity to the antenna located on the center armrest. The charge device in particular may be adapted to hold the first mobile communications unit at the center console tunnel. To do so, the charge device may have a surface that provides sufficient retention force, for example, or a holding device into which the mobile communications unit may be placed. In addition, a short distance is possible between the antenna and a second mobile communications unit, which is disposed above the center armrest or which is held there (e.g., by a passenger in a rear seat or a holding device). Adequate proximity between the antenna and both mobile communications units for the near field communication thus is able to be provided in this manner while one of the two mobile communications units is charged. In particular, a center armrest which is able to move relative to the center console tunnel may cover or uncover the charge device (together with the inserted mobile communications unit). The charge device may be situated on the center armrest separately from the antenna. Charging of a first mobile communications unit by the charge device and spatial proximity of the first mobile communications unit to the separate, i.e., physically separated, antenna are therefore possible at the same time. Simultaneously, it can be prevented that the charge device or a mobile communications unit situated on the charge device covers the antenna. For example, the mobile communications unit may be situated on the surface designed to retain the mobile communications unit on the center armrest, and the charge device may be placed in relation to the surface such that the mobile communications unit is able to be charged in a wireless manner.

The control unit may be adapted to transmit a control signal via the antenna or a second antenna coupled with the control unit, that induces the mobile communications unit to start a predefined application. The second antenna is configured to emit a second radio signal for a second communications technology. A passenger is able to interact with the motor vehicle via the application on the mobile communications unit. For example, the application may bring the mobile communications unit into an auto mode (car mode), which, for example, couples the mobile communications unit with the motor vehicle. A mirror-link connection to the motor vehicle may be established, for instance, and a touch screen of the mobile communications unit may be used as input field for operating an infotainment system of the motor vehicle. The operation of the infotainment system may be more comfortable for a passenger of the motor vehicle because of the excellent accessibility of the touch screen of the mobile communications unit. The application, for example, may also initiate automatic forwarding of an incoming call to a hands-free telephone of the motor vehicle for greater safety of the passengers of the vehicle. The control signal may be output both via near field communication (i.e., by the antenna) and via the second communications technology (i.e., the second antenna). Depending on an expected transmit or receive data quantity, for example, a decision may be made whether to emit the control signal via the antenna or the second antenna. The second communications technology, for instance, may be used for carrying out the further communication between the control unit and mobile communications unit once the control signal has been sent. The near field communication can be employed to initiate the communication via the second communications technology.

The second communications technology may comply with the IEEE 802.15.1 standard or a standard of the IEEE 802.11 standard family of the Institute of Electrical and Electronics Engineers (IEEE). The IEEE 802.15.1 standard allows a communication via Bluetooth, and standards of the standard family IEEE 802.11 allow a communication via WLAN or Wi-Fi. Part of the IEEE 802.11 standard family are in particular the standards IEEE 802.11, IEEE 802.11a, IEEE 802.11b, IEEE 802.11c, IEEE 802.11d, IEEE 802.11e, IEEE 802.11f, IEEE 802.11g, IEEE 802.11h, IEEE 802.11i, IEEE 802.11j, IEEE 802.11k, IEEE 802.11m, IEEE 802.11n, IEEE 802.11o, IEEE 802.11p, IEEE 802.11q, IEEE 802.11r, IEEE 802.11s, IEEE 802.11t, IEEE 802.11u, IEEE 802.11v, IEEE 802.11w, IEEE 802.11z, IEEE 802.11aa, IEEE 802.11ac, IEEE 802.11ad, IEEE 802.11ae, IEEE 802.11af, IEEE 802.11ah, IEEE 802.11ai, etc. Conventional mobile communications units available on the market support at least one of the two communications technologies, so that an exchange even of larger data quantities is possible between the mobile communications unit and motor vehicle. Because Bluetooth and WLAN use frequencies in the Gigahertz range, possible interference in the near field communication by the second antenna is minimized. To the extent individual standards are referred, this means the version of the particular standard that is effective at the filing date hereof.

Exemplary embodiments of the present invention furthermore also pertain to a motor vehicle equipped with a device described herein. It is therefore possible to make a motor vehicle available that offers a high degree of comfort to passengers in a near field communication with the motor vehicle.

Exemplary embodiments of the present invention will be described in greater detail below with reference to the appended Figures.

DETAILED DESCRIPTION

Figure 1:
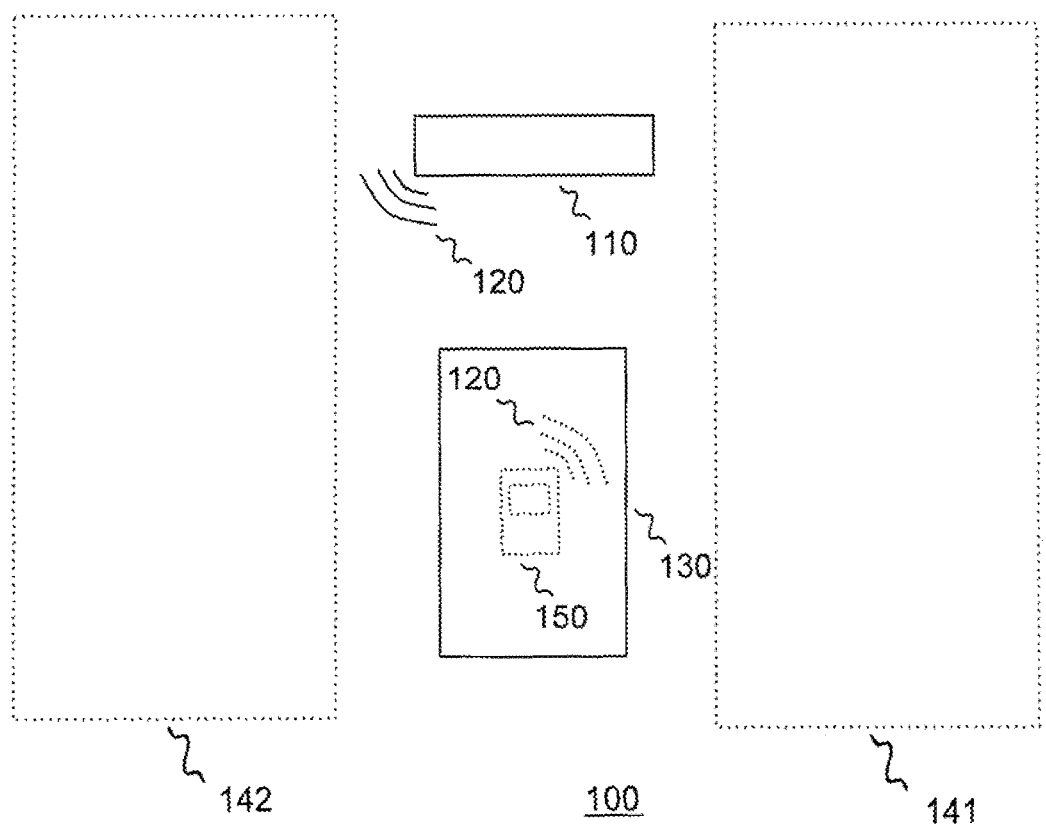
FIG. 1 schematically illustrates a device for coupling a mobile communications unit with a motor vehicle.

FIG. 1 illustrates a device 100 for a motor vehicle for coupling a mobile communications unit 150 with the motor vehicle. Device 100 can be placed between a driver seat 141 and a passenger seat 142 of the motor vehicle. Device 100 has a surface 130 on which mobile communications unit 150 may be placed. For example, surface 130 could be provided on a center armrest or a center console tunnel of the motor vehicle. Surface 130 is directly accessible to a passenger of the motor vehicle, i.e., it is not covered or coverable by other components of the motor vehicle.

In addition, device 100 includes an antenna 110, which, for example, may be embedded in a padding material of the center armrest, a selector lever for a drive stage or a gear, or in the center console tunnel of the motor vehicle. Antenna 110 is adapted to emit and/or receive a radio signal 120 for the near field communication with mobile communications unit 150. Radio signal 120 has a frequency of under 100 MHz (e.g., 13.56 MHz). Furthermore, antenna 110 may be coupled with a control unit, so that mobile communications unit 150 is able to communicate with the control unit, i.e., the motor vehicle, via antenna 110.

The space between driver and passenger seat 141, 142, and thus antenna 110, as well, is easily accessible both to passengers in driver and passenger seats 141, 142 of the motor vehicle and to passengers in the rear seats. As a result, passengers in the front seats as well as in the rear seats are easily able to bring mobile communications unit 150 close enough to antenna 110 to thereby allow a near field communication between motor vehicle and mobile communications unit 150. The passengers thus are able to interact with the motor vehicle in a comfortable manner.

As explained above, the antenna is embeddable in a center armrest of the motor vehicle. Different exemplary embodiments of center armrests are illustrated in FIGS. 2a to 2c.

Figure 2A:
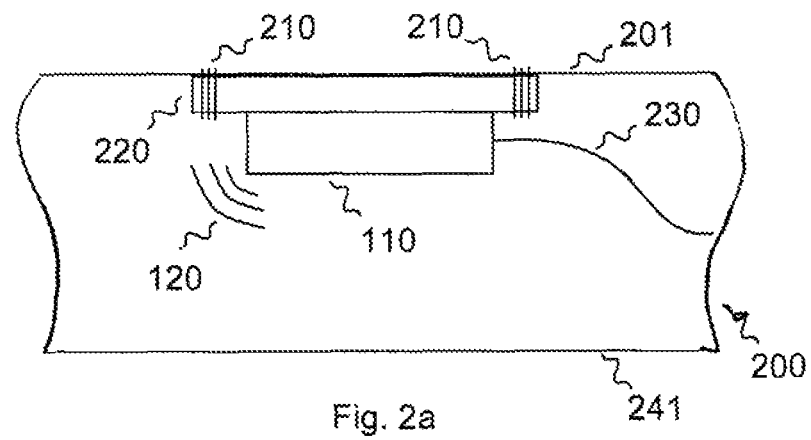
FIG. 2a schematically illustrates a partial view of a section through a center armrest.
Figure 2B:
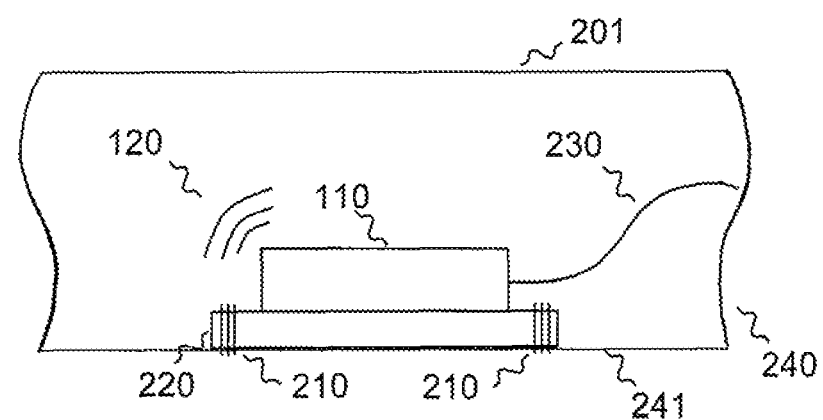
FIG. 2b schematically illustrates a partial view of a section through a center armrest.
Figure 2C:
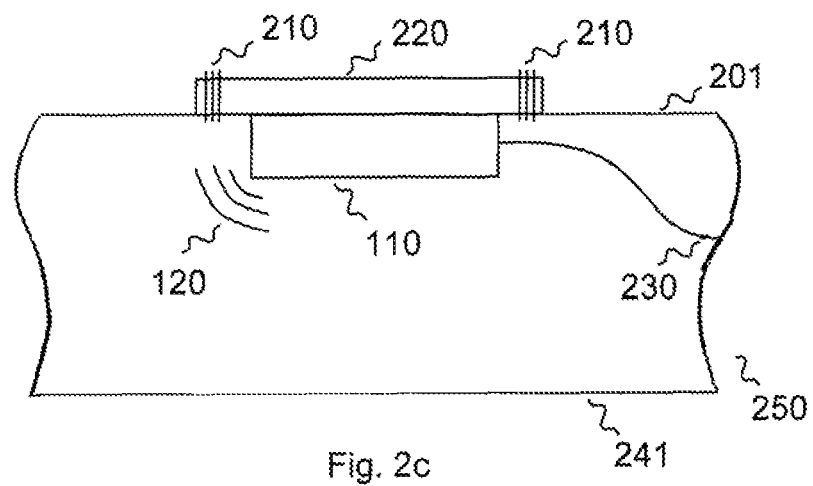
FIG. 2c schematically illustrates a partial view of a section through a center armrest.

FIG. 2a schematically illustrates a partial view of a section through a center armrest 200. Center armrest 200 is placed horizontally, i.e., a support area 201 for an arm of a person is in a horizontal position.

Antenna 110 is disposed at a vertically upper position of center armrest 200, e.g., antenna 110 has a vertical clearance from support area 201 that amounts to no more than 30% of a vertical overall height of center armrest 200. The vertical overall height corresponds to the vertical clearance between support area 201 and an underside 241 of center armrest 200. Antenna 110 is coupled with a control unit via a line 230, which may be routed through padding material of center armrest 200.

Antenna 110 is disposed on a carrier 220, which has greater rigidity than antenna 110 itself. Carrier 220 is able to protect antenna 110 from deformation by a mechanical force that is acting on center armrest 200 from the outside. The carrier may also be arranged as a combination of circuit board material on which the antenna is mounted, and a more flexible material connected thereto. The surface may include information that pertains to its function. Carrier 220 is fixed in place on support area 201 by seams 210, i.e., carrier 210 is mounted on an exterior material of center armrest 200 that has the smallest vertical clearance from antenna 110. In particular, seams 210 may be decorative seams so as to visually and haptically mark the position of antenna 110 on support area 201 for a vehicle passenger. Carrier 220 is situated directly on support area 201, so that a passenger of the motor vehicle is able to detect carrier 220 by feel due to the different rigidities of carrier 220 and the surrounding padding material. A position of antenna 110 on center armrest 200 is thereby detectable by a passenger even under difficult lighting conditions inside the motor vehicle. As an alternative, a separating layer may be disposed between support area 201 and carrier 220. For example, there may be padding material between support area 201 and carrier 220 in order to ensure high support comfort for a passenger resting an arm on support area 201.

Placing antenna 110 underneath support area 201 may allow a small clearance between the antenna and a mobile communications unit held against or positioned on support area 201 from the outside. Sufficient proximity between the mobile communications unit and antenna 110 for the near field communication is therefore providable.

FIG. 2b schematically illustrates a partial view of a section through an alternative center armrest 240. In contrast to center armrest 200 illustrated in FIG. 2a, antenna 110 is disposed at a vertically lower position of center armrest 240, e.g., antenna 110 has a vertical clearance from underside 241 that amounts to no more than 30% of the vertical overall height of center armrest 240. Once again, antenna 110 is situated on a carrier 220, which is fixed in place on underside 241 of the armrest by seams 210 or some other suitable fastening arrangement, such as bonding, latching, screw-fitting, etc.; in other words, carrier 210 is mounted on an exterior material of center armrest 240 that has the smallest vertical clearance possible from antenna 110. The placement on underside 241 may allow a small clearance between antenna 110 and a first mobile communications unit that is situated underneath center armrest 240 or retained there. In addition, the placement at underside 241 may furthermore allow a short distance between the antenna and a second mobile communications unit situated or held above support area 201 of center armrest 240 (e.g., by a passenger in the rear passenger compartment). This makes it possible to provide sufficient proximity between antenna 110 and the two mobile communications units for the near field communication. One advantage of this arrangement is the reduced overall height and the more unified surface feel of support area 201. It may be enhanced even further by shifting antenna 110 and carrier 220 into a depression of the plastic element of center armrest 240. Here, too, the support area may include pertinent information. According to FIG. 2b, antenna 110, an antenna line, and carrier material 220 may thus be fixed in place in a depression of the material of the center armrest as well in order to provide a uniform surface feel. Optionally, it is also possible to place corresponding visual or haptic elements on support area 201 in order to provide information about the special function of this area.

FIG. 2c schematically illustrates a partial view of a section through a further alternative center armrest 250. In contrast to the arrangements illustrated in FIGS. 2a and 2b, carrier 220 is disposed on the outside of support area 201, i.e., an external surface of center armrest 250. As an alternative or in addition, it is also possible to place carrier 200 on underside 241 of center armrest 250. The haptic feel of carrier 220, and thus of antenna 110 as well, for a passenger of the motor vehicle can be enhanced by placing carrier 220 on an external surface of center armrest 250. In particular under difficult lighting conditions inside the passenger compartment, it may be easier for a passenger to detect the position of antenna 110 in this manner. Additionally, the haptic perceivability may be increased even further by selecting appropriate patterning or material for carrier 220. Moreover, better visual noticeability of carrier 220, and thus of antenna 110 as well, may be obtained by an appropriate visual, i.e., colored, design of carrier 220. The carrier may also be arranged as a combination of circuit board material, on which the antenna is mounted, and a more flexible decorative external material (such as leather) connected thereto. The surface may include information that relates to its function.

Figure 3:
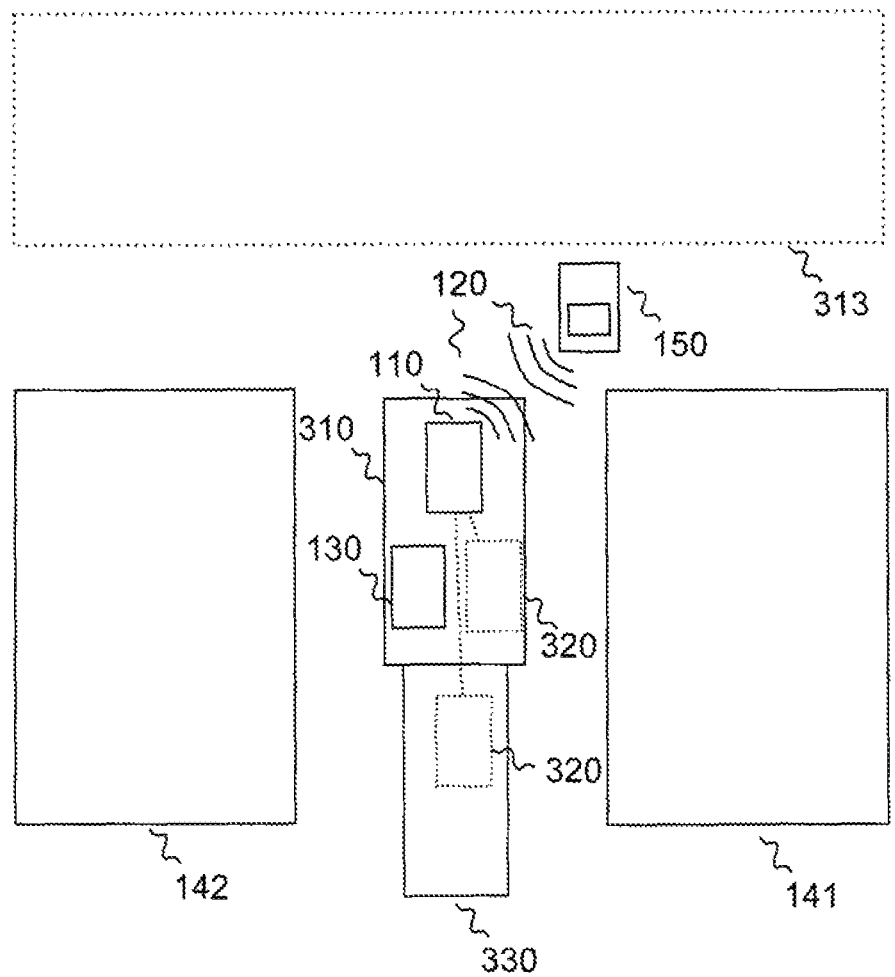
FIG. 3 schematically illustrates a portion of a motor vehicle having an exemplary embodiment of a device for coupling a mobile communications unit with the motor vehicle.

FIG. 3 schematically illustrates a portion of a motor vehicle 300. Motor vehicle 300 has a front driver seat 141 and a passenger seat 142. In addition, vehicle 300 has a rear passenger compartment 313, which is illustrated as a rear-seat bench of motor vehicle 300. A center armrest 310 (for instance as illustrated in FIGS. 2a to 2c) is disposed between driver seat 141 and passenger seat 142. Armrest 310 is situated on a center console tunnel 330, which at least partially extends between driver seat 141 and passenger seat 142. Center armrest 310 may be situated on center console tunnel 330 so as to allow movement (rotational or sliding). Center armrest 310 may also be made up of multiple partial support areas, which jointly form a support area for an arm of a person. As an alternative, the armrest, for example, may also be situated on driver seat 141 or passenger seat 142.

Armrest 310 is equipped with an antenna 110, which is adapted to emit and/or to receive a radio signal 120 for the near field communication with a mobile communications unit 150. For example, a surface 130 on which mobile communications unit 150 can be placed may be provided on center armrest 310. Surface 130 may be used as holding device for retaining mobile communications unit 150 on center armrest 310. For this purpose, surface 130, for example, may be part of a depression in center armrest 310, into which mobile communications unit 150 can be placed (and which includes the further clamping device for clamping mobile communications unit 150), or it may have a corresponding coating or surface structure so that sufficient retention force is provided between surface 130 and a surface of mobile communications unit 150.

Antenna 110 is coupled with a separate control unit 320, which is adapted to transmit a signal to mobile communications unit 150 via antenna 110 or to receive one from mobile communications unit 150. As illustrated in FIG. 3, there are various options for the placement of control unit 320 inside motor vehicle 300. For example, control unit 320 may be installed at center console tunnel 330 of motor vehicle 300 or on center armrest 310. Control unit 320 in particular may be a control unit already provided in motor vehicle 300, which has been supplemented by the near field communication functionality (for instance by updating the existing software). For example, it may be a control unit for a charge device for mobile communications unit 150. The charge device can be mounted on center console tunnel 330 or on center armrest 310, for instance. This allows a near field communication between mobile communications unit 150 and motor vehicle 300 while mobile communications unit 150 is charged in a wireless manner. As an alternative or in addition, control unit 320 may also control a coupling device in order to couple an antenna of mobile communications unit 150 with an external antenna of motor vehicle 300 in an effort to thereby improve a connection to a mobile telephony network.

As indicated by the position of mobile communications unit 150, antenna 110 may easily be accessed both by passengers in rear passenger compartment 313 of motor vehicle 300 and by passengers in driver and passenger seats 141, 142. A communication with motor vehicle 300 via mobile communications unit 150 may therefore be easy and comfortable for a passenger.

Using a control unit 320 already installed in the motor vehicle for the purpose of providing the near field communications interface makes it possible to realize the interface using only a few additional components (antenna 110 and a line to control unit). The possibility of a near field communication by motor vehicle 300 may therefore be provided in a cost-effective and uncomplicated manner.

LIST OF REFERENCE NUMERALS 100 device
110 antenna
120 radio signal
130 surface
141 driver seat
142 front passenger seat
150 mobile communications unit
200 center armrest
201 support area
210 seam
220 carrier
230 line
240 center armrest
241 underside of center armrest
250 center armrest
300 motor vehicle
313 rear passenger compartment of motor vehicle
310 center armrest
320 control unit
330 center console tunnel

What is claimed is:

1. A system, comprising:
a device adapted to couple a mobile communications unit with a motor vehicle including a front and rear row of seats, the device being adapted to be placed between a driver seat and a passenger seat of the motor vehicle, the device including:
an antenna adapted to emit and/or receive a radio signal for near field communication with the mobile communications unit;
a center armrest adapted to support an arm of a person seated in the driver seat or the passenger seat accessible to passengers sitting in the front and rear row of seats, the antenna being embedded in a padding material of the center armrest in sufficient proximity to an upper surface of the armrest, such that near field communication with the mobile communication unit that is held or positioned adjacent to the upper surface of center armrest is enabled; and
a surface adapted to accommodate a second mobile device;
wherein the antenna is provided on a carrier, arranged in the center armrest;
wherein the rigidity of the carrier is greater than the rigidity of a padding material of the center armrest;
wherein the surface is provided beneath the center armrest; and
wherein, the antenna is situated within the center armrest such that both the mobile device held or positioned adjacent to the upper surface of center armrest and the second mobile device held or positioned adjacent to the surface are in sufficient proximity for near field communication with the antenna.

2. The system according to claim 1, wherein the radio signal has a frequency of under 100 MHz.

3. The system according to claim 1, wherein the antenna is arranged at a vertically upper or vertically lower position of the center armrest when a support area of the center armrest for the art of the person is in a horizontal position.

4. The system according to claim 3, wherein the antenna is provided on a carrier having greater rigidity than the antenna, the carrier being disposed between the antenna and an exterior material of the center armrest that has a lowest vertical clearance from the antenna when the support area is in the horizontal position.

5. The system according to claim 3, wherein the antenna is provided on a carrier having greater rigidity than the antenna, the carrier being disposed on an external surface of the center armrest.

6. The system according to claim 1, wherein the device includes a separate control unit coupled with the antenna and adapted to transmit a signal to the mobile communications unit via the antenna or to receive a signal from the mobile communications unit.

7. The system according to claim 6, wherein the control unit is adapted to control a charge device, the charge device being adapted to supply energy to charge an energy store of the mobile communications device in a wireless manner, and/or to control a coupling device adapted to couple an external antenna of the motor vehicle with an antenna of the mobile communications unit.

8. The system according to claim 7, wherein the control unit is provided on a center console tunnel of the motor vehicle.

9. The system according to claim 8, wherein the center armrest is provided on the center console tunnel in a manner that allows the center armrest to move.

10. The system according to claim 9, wherein the charge device is located vertically below a position of the antenna on the center console tunnel.

11. The system according to claim 6, wherein the control unit is adapted to transmit a control signal via the antenna or a second antenna coupled with the control unit and adapted to emit a second radio signal for a second communications technology, the control signal inducing the mobile communications unit to start a predefined application.

12. The system according to claim 11, wherein the second communications technology complies with the IEEE 802.15.1 standard or a standard of the IEEE 802.11 standard family of the Institute of Electrical and Electronics Engineers (IEEE).

13. A motor vehicle, comprising the system recited in claim 1.

14. The motor vehicle according to claim 13, wherein the radio signal has a frequency of under 100 MHz.

15. The motor vehicle according to claim 13, wherein the antenna is arranged at a vertically upper or vertically lower position of the center armrest when a support area of the center armrest for the arm of the person is in a horizontal position.

16. The motor vehicle according to claim 15, wherein the antenna is provided on a carrier having greater rigidity than the antenna, the carrier being disposed between the antenna and an exterior material of the center armrest that has a lowest vertical clearance from the antenna when the support area is in the horizontal position.

17. The motor vehicle according to claim 15, wherein the antenna is provided on a carrier having greater rigidity than the antenna, the carrier being disposed on an external surface of the center armrest.

18. The motor vehicle according to claim 13, wherein the device includes a separate control unit coupled with the antenna and adapted to transmit a signal to the mobile communications unit via the antenna or to receive a signal from the mobile communications unit.

19. The motor vehicle according to claim 18, wherein the control unit is adapted to control a charge device, the charge device being adapted to supply energy to charge an energy store of the mobile communications device in a wireless manner, and/or to control a coupling device adapted to couple an external antenna of the motor vehicle with an antenna of the mobile communications unit.

20. The motor vehicle according to claim 19, wherein the control unit is provided on a center console tunnel of the motor vehicle.

21. The motor vehicle according to claim 20, wherein the center armrest is provided on the center console tunnel in a manner that allows the center armrest to move.

22. The motor vehicle according to claim 21, wherein the charge device is located vertically below a position of the antenna on the center console tunnel.

23. The motor vehicle according to claim 18, wherein the control unit is adapted to transmit a control signal via the antenna or a second antenna coupled with the control unit and adapted to emit a second radio signal for a second communications technology, the control signal inducing the mobile communications unit to start a predefined application.

24. The motor vehicle according to claim 23, wherein the second communications technology complies with the IEEE 802.15.1 standard or a standard of the IEEE 802.11 standard family of the Institute of Electrical and Electronics Engineers (IEEE).

* * * * *